(12) United States Patent
Chong et al.

(10) Patent No.: US 12,193,351 B2
(45) Date of Patent: Jan. 14, 2025

(54) SMALL HAND-GUIDED SELF-PROPELLED GARLIC PLANTER

(71) Applicant: JINAN HUAQING AGRICULTURAL MACHINERY TECHNOLOGY CO., LTD., Shandong (CN)

(72) Inventors: Jun Chong, Jinan (CN); Guanghui Zhang, Jinan (CN); Yong Liu, Jinan (CN); Yongshuai Shen, Jinan (CN); Lu Chong, Jinan (CN)

(73) Assignee: JINAN HUAQING AGRICULTURAL MACHINERY TECHNOLOGY CO., LTD., Jinan (CN)

( * ) Notice: Subject to any disclaimer, the term of this patent is extended or adjusted under 35 U.S.C. 154(b) by 741 days.

(21) Appl. No.: 17/609,266

(22) PCT Filed: May 12, 2020

(86) PCT No.: PCT/CN2020/089858
§ 371 (c)(1),
(2) Date: Nov. 5, 2021

(87) PCT Pub. No.: WO2021/031628
PCT Pub. Date: Feb. 25, 2021

(65) Prior Publication Data
US 2022/0225562 A1    Jul. 21, 2022

(30) Foreign Application Priority Data

Aug. 20, 2019  (CN) .......................... 201910770639.0

(51) Int. Cl.
*A01C 7/04*   (2006.01)
*A01C 7/12*   (2006.01)
(Continued)

(52) U.S. Cl.
CPC ................ *A01C 19/04* (2013.01); *A01C 7/04* (2013.01); *A01C 7/125* (2013.01); *A01C 7/208* (2013.01)

(58) Field of Classification Search
CPC .......... A01C 7/002; A01C 7/04; A01C 7/125; A01C 7/208; A01C 19/04
(Continued)

(56) References Cited

FOREIGN PATENT DOCUMENTS

| CN | 105144924 A | 12/2015 | |
|---|---|---|---|
| CN | 106982579 A * | 7/2017 | ............... A01C 9/08 |

(Continued)

OTHER PUBLICATIONS

May 27, 2020 Office Action issued in Chinese Patent Application No. 201910770639.0.
(Continued)

*Primary Examiner* — Alicia Torres
(74) *Attorney, Agent, or Firm* — Oliff PLC (57) ABSTRACT

A small hand-guided self-propelled garlic planter includes a driving mechanism disposed on a rack and connected to an upright planting mechanism and a material taking mechanism in a stock bin. The upright planting mechanism includes a material receiving mechanism fixed to the rack and an insertion type planting mechanism below the material receiving mechanism. The insertion type planting mechanism is connected to a turnable mechanism mounted to the rack and connected to the driving mechanism. Feed bowls are disposed on the material receiving mechanism and are connected to a first opening mechanism. Movement of the insertion type planting mechanism causes a first acting member to drive the first opening mechanism. Duckbills are disposed on the insertion type planting mechanism and are connected to a second opening mechanism. Movement of
(Continued)

the insertion type planting mechanism causes a second acting member to drive the second opening mechanism.

10 Claims, 6 Drawing Sheets

(51) Int. Cl.
    *A01C 7/20*      (2006.01)
    *A01C 19/04*      (2006.01)

(58) Field of Classification Search
    USPC .................................................. 111/908, 909
    See application file for complete search history.

(56) References Cited

FOREIGN PATENT DOCUMENTS

| | | | | |
|---|---|---|---|---|
| CN | 206402678 | U | 8/2017 | |
| CN | 206993682 | U | 2/2018 | |
| CN | 207022469 | U | 2/2018 | |
| CN | 108668574 | A | 10/2018 | |
| CN | 109089444 | A | 12/2018 | |
| CN | 208549216 | U | 3/2019 | |
| CN | 109964597 | A | 7/2019 | |
| CN | 109997468 | A | 7/2019 | |
| CN | 110073782 | A * | 8/2019 | ............. A01C 19/04 |
| CN | 110476554 | A | 11/2019 | |
| CN | 305655342 | S | 3/2020 | |
| JP | 3459403 | B2 | 10/2003 | |
| JP | 4431653 | B2 | 3/2010 | |
| KR | 1020170132373 | A | 12/2017 | |
| WO | WO-2014017732 | A1 * | 1/2014 | ............. A01B 49/06 |

OTHER PUBLICATIONS

Aug. 4, 2020 Search Report issued in International Patent Application No. PCT/CN2020/089858.

Aug. 4, 2020 Written Opinion issued in International Patent Application No. PCT/CN2020/089858.

* cited by examiner

SMALL HAND-GUIDED SELF-PROPELLED GARLIC PLANTER

TECHNICAL FIELD

The present invention relates to the technical field of agricultural machinery and equipment, and in particular, to a small hand-guided self-propelled garlic planter.

BACKGROUND

During garlic planting, buds of garlic seeds are required to be oriented upright. Insertion type planting is used to simulate artificial planting. In addition, a three-level adjustment device is mounted in an insertion type planter. In this way, the buds of the garlic seeds can be planted upright. By means of the insertion type planter, the problem of failing to planting the garlic seeds upright in the existing planting methods such as broadcast planting and ditch planting is resolved. The opening and closing of the existing adjustment feed bowl are realized by using a cylinder as the driving force. However, the cylinder requires an air pump which is relatively large and heavy. Therefore, the above method of opening and closing the feed bowl is suitable for a large garlic planter, but cannot be used for mechanical planting in a small plot. On the other hand, existing small planters that can enter a small plot for planting are incapable of upright planting.

SUMMARY

In order to overcome the disadvantages of the prior art, the present invention provides a small hand-guided self-propelled garlic planter. By means of the present invention, planting in small plots and upright planting are both achieved.

A small hand-guided self-propelled garlic planter includes a rack. A driving mechanism is disposed on the rack. The driving mechanism is connected to road wheels, and is connected to an upright planting mechanism and a material taking mechanism in a stock bin by using a clutch mechanism. The stock bin is fixedly connected to the rack.

The upright planting mechanism includes a material receiving mechanism fixed to the rack and an insertion type planting mechanism disposed below the material receiving mechanism. The insertion type planting mechanism is connected to a turnable mechanism mounted to the rack, the turnable mechanism is connected to the driving mechanism. The driving mechanism is capable of driving, by using the turnable mechanism, the insertion type planting mechanism to move according to a set arc trajectory. A plurality of openable and closable first feed bowls are disposed on the material receiving mechanism. The first feed bowls are configured to receive garlic seeds delivered by the material taking mechanism. The first feed bowls are connected to a first opening mechanism. A first acting member is disposed on the insertion type planting mechanism. The movement of the insertion type planting mechanism causes the first acting member to drive the first opening mechanism to operate. The first opening mechanism is capable of driving the first feed bowls to open, so that the garlic seeds fall into the insertion type planting mechanism. A plurality of openable and closable duckbills are disposed on the insertion type planting mechanism. The duckbills are configured to receive garlic seeds dropped from the first feed bowls. The duckbills are connected to a second opening mechanism. A second acting member is disposed on the rack. The insertion type planting mechanism is configured to move to cause the second acting member to drive the second opening mechanism to operate. The second opening mechanism is capable of driving the duckbills to open to plant the garlic seeds.

Further, the turnable mechanism includes a first turnable shaft connected to the driving mechanism. The first turnable shaft is fixedly connected to one end of a first crank. An other end of the first crank is rotatably connected to one end of a swingable arm. An other end of the swingable arm is rotatably connected to the insertion type planting mechanism. The insertion type planting mechanism is fixedly connected to one end of a connecting rod. An other end of the connecting rod is rotatably connected to one end of a second crank. An other end of the second crank is rotatably connected to a second turnable shaft disposed on the rack.

Further, a counterweight is fixedly connected to an end of the first turnable shaft, and the counterweight is rotatable by the first turnable shaft.

Further, the material receiving mechanism includes a first frame. A plurality of material receiving rotary shaft sets are rotatably connected to the first frame. Each material receiving rotary shaft set includes a first rotary shaft and a second rotary shaft. The first rotary shaft and the second rotary shaft are respectively fixedly connected to two feed bowl portions of each first feed bowl.

Further, the first opening mechanism includes fan-shaped gears respectively disposed on ends of the first rotary shaft and the second rotary shaft and meshed with each other. The plurality of first rotary shafts are all connected to a first parallelogram linkage. The first acting member is configured to be in contact with the first rotary shaft, and is capable of driving, by using the parallelogram linkage, the first rotary shafts to rotate. The first parallelogram linkage is connected to a first elastic member disposed on the first frame. The first elastic member is configured to cause the first parallelogram linkage to return.

Further, the insertion type planting mechanism includes a second frame, a plurality of insertion type planting rotary shaft sets are rotatably connected to the second frame. Each insertion type planting rotary shaft set includes a third rotary shaft and a fourth rotary shaft. The third rotary shaft and the fourth rotary shaft are respectively fixedly connected to a first duckbill portion and a second duckbill portion of each duckbill.

Further, the second opening mechanism includes two opening plates, one ends of the two opening plates are respectively fixedly connected to ends of third rotary shafts and fourth rotary shafts of adjacent insertion type planting rotary shaft sets. The second acting member has a tip structure. The tip structure is configured to be inserted into a gap between the two opening plates. The movement of the insertion type planting mechanism drives other ends of the two opening plates to open. A second elastic member is disposed between the two opening plates to cause the two opening plates to return.

Further, a plurality of second feed bowls are disposed above the duckbills. The second feed bowls are connected to a third opening mechanism. The opening plates are capable of driving the third opening mechanism to drive the second feed bowls to open.

Further, a plurality of first feed bowl rotary shaft sets rotatably connected to the second frame are disposed above the duckbills. Each first feed bowl rotary shaft set includes a fifth rotary shaft and a sixth rotary shaft. The fifth rotary shaft and the sixth rotary shaft are respectively connected to two feed bowl portions of each second feed bowl.

Further, the third opening mechanism includes fan-shaped gears connected to ends of the fifth rotary shaft and the sixth rotary shaft and meshed with each other. The plurality of fifth rotary shaft shafts are connected to a second parallelogram linkage. A third acting member is disposed on the second parallelogram linkage. The opening of the opening plates drives the third acting member to drive the second parallelogram linkage to operate, to open the second feed bowls. The second parallelogram linkage is connected to a third elastic member disposed on the second frame. The third elastic member is configured to cause the second parallelogram linkage to return.

Further, a plurality of third feed bowls each having an inverted cone structure are disposed between the second feed bowls and the duckbills. The third feed bowls are connected to a fourth opening mechanism. The movement of the insertion type planting mechanism causes the material receiving mechanism to drive the fourth opening mechanism to open the third feed bowls.

Further, a plurality of second feed bowl rotary shaft sets rotatably connected to the second frame are disposed between the second feed bowl and the duckbill. Each second feed bowl rotary shaft set includes a seventh rotary shaft and an eighth rotary shaft. The seventh rotary shaft and the eighth rotary shaft are respectively fixedly connected to two feed bowl portions of each third feed bowl.

Further, the fourth opening mechanism includes fan-shaped gears connected to ends of the seventh rotary shaft and the eighth rotary shaft and meshed with each other. A third parallelogram linkage is connected to the plurality of seventh rotary shaft shafts. The third parallelogram linkage is connected to a fourth acting member. The material receiving mechanism is capable of driving the fourth acting member to drive the fourth opening mechanism to open the second feed bowls.

Further, a baffle is disposed at a material outlet of the stock bin, a feeding chute is connected between the baffle and the material receiving mechanism, and the garlic seeds enter the material receiving mechanism through the feeding chute.

Further, the driving mechanism is connected to the road wheels by using a first chain transmission mechanism, and is capable of driving the road wheels to rotate.

Further, the clutch mechanism includes a clutch shaft. Two ends of the clutch shaft are rotatably connected to the rack by using a bearing seat. A sprocket is rotatably connected to the clutch shaft, a first chuck is fixed to the sprocket. A second chuck mated with the first chuck is fixed to the clutch shaft, the first chuck is configured to be engaged with the second chuck. A shift fork is connected to the second chuck. The shift fork is capable of driving the second chuck to be engaged with the first chuck. The sprocket is connected to the driving mechanism by using a second chain transmission mechanism. The clutch shaft is connected to the material taking mechanism and the turnable mechanism by using the third chain transmission mechanism and a fourth chain transmission mechanism respectively.

Beneficial effects of the present invention are as follows:

1. According to the garlic planter of the present invention, the insertion type planting mechanism is connected to the rack by using the turnable mechanism, and the turnable mechanism can drive the insertion type planting mechanism to move along the set arc trajectory. By means of the movement of the insertion type planting mechanism, the first feed bowls, the second feed bowls, the third feed bowls, and the duckbills are opened and closed by means of mechanical contact in a reciprocating movement cycle of the insertion type planting mechanism. The garlic seeds pass through the first feed bowls, the second feed bowls, and the third feed bowls successively and then fall into the duckbills. Therefore, it can be ensured that buds of the garlic seeds are upright, realizing upright planting. The first feed bowls, the second feed bowls, the third feed bowls, and the duckbills can be opened and closed without an air pump, and are suitable to be mounted to the small garlic planter. In this way, planting in small plots and upright planting are both achieved.

2. According to the garlic planter of the present invention, a clutch mechanism is disposed. By means of the clutch mechanism, the power connection among the material taking mechanism, the turnable mechanism, and the driving mechanism can be cut off. When the entire garlic planter needs to travel but not to plant, the driving mechanism can drive only the road wheels to operate, facilitating the movement of the garlic planter and reducing energy consumption.

BRIEF DESCRIPTION OF THE DRAWINGS

The accompanying drawings constituting a part of this application are used for providing further understanding for this application. Exemplary embodiments of this application and descriptions thereof are used for explaining this application and do not constitute a limitation to this application.

1. Rack, 2. Handle, 3. Depth wheel support, 4. Depth wheel, 5. Engine, 6. Decelerator, 7. First sprocket, 8. Second sprocket, 9. Fifth sprocket, 10. Third sprocket, 11. Road wheel, 12. Clutch mechanism, 12-1. Clutch shaft, 12-2. Fourth sprocket, 12-3. First chuck, 12-4. First fixture, 12-5. Second chuck, 12-6. Second fixture, 13. Material taking mechanism, 14. Material receiving mechanism, 14-1. Support rod, 14-2. First mounting plate, 14-3. First feed bowl, 14-4. First rotary shaft, 14-5. Second rotary shaft, 14-6. First fan-shaped gear, 14-7. Connecting rod, 14-8. Opening rod, 14-9. First bearing, 14-10. Inclined arcuate plate, 14-11. Inclined arcuate plate support, 15. Insertion type planting mechanism, 15-1. Second mounting plate, 15-2. Side frame, 15-3. Third rotary shaft, 15-4. Fourth rotary shaft, 15-5.

Duckbill, 15-6. First opening plate, 15-7. Second opening plate, 15-8. Second bearing, 15-9. Support, 15-10. Triangular plate, 15-11. Second feed bowl, 15-12. Fifth rotary shaft, 15-13. Sixth rotary shaft, 15-14. Second fan-shaped gear, 15-15. Second parallelogram linkage, 15-16. Right-angled rod, 15-17. Third feed bowl, 15-18. Seventh rotary shaft, 15-19. Eighth rotary shaft, 15-20. Third fan-shaped gear, 15-21. Third parallelogram linkage, 15-22. Rotary drum, 15-23. First support rod, 15-24. Second support rod, 15-25. Third support rod, 15-26. Arcuate rod, 16. Stock bin, 17. Stock bin support plate, 18. Baffle, 19. Material guide roller, 20. Feeding chute, 21. Third chain transmission mechanism, 22. Fourth chain transmission mechanism, 23. First turnable shaft, 24. First crank, 25. Swingable arm, 26. U-shaped rod, 27. Connecting rod, 28. Adjustment rod, 29. Second crank, 30. Shaft sleeve 31. Shaft sleeve support 32. Counterweight.

DETAILED DESCRIPTION

It should be noted that the following detailed descriptions are all exemplary and are intended to provide a further understanding of this application. Unless otherwise specified, all technical and scientific terms used herein have the same meaning as commonly understood by a person of ordinary skill in the art to which this application belongs.

It should be noted that terms used herein are only for describing specific implementations and are not intended to limit exemplary implementations according to this application. As used herein, the singular form is intended to include the plural form, unless the context clearly indicates otherwise. In addition, it should further be understood that terms "comprise" and/or "include" used in this specification indicate that there are features, steps, operations, devices, components, and/or combinations thereof.

For convenience of description, the terms "above", and "below" only indicate directions consistent with those of the accompanying drawings, are not intended to limit the structure, and are used only for ease and brevity of illustration and description, rather than indicating or implying that the mentioned device or element needs to have a particular orientation or needs to be constructed and operated in a particular orientation. Therefore, such terms should not be construed as a limitation to the present invention.

As described in the background, feed bowls in an insertion type planting mechanism in an existing garlic planter require an air pump to be opened. The air pump is large and heavy, and therefore is not applicable to small planters for planting in small plots. An existing small planter is incapable of upright planting. In view of the above problems, this application provides a small hand-guided self-propelled garlic planter.

In a typical implementation, that is, Embodiment 1 of this application, as shown in FIG. 1 to FIG. 11, a small hand-guided self-propelled garlic planter includes a rack 1. A handle 2 is disposed at an upper part of a rear end of the rack. A depth wheel 4 is mounted at a bottom of the rear end by using a depth wheel support 3. A driving mechanism is mounted at the rear end of the rack. The driving mechanism includes an engine 5 fixed to the rack. A decelerator 6 is drivingly connected to an output shaft of the engine by using a belt. An output shaft of the decelerator is connected to a road wheel shaft by using a first chain transmission mechanism. Specifically, the output shaft of the decelerator is connected to a first sprocket 7, the first sprocket is connected to a second sprocket 8 by using a transmission chain, and the second sprocket is rotatably connected to the rack by using the shaft. A fifth sprocket 9 disposed coaxially with the second sprocket is disposed on the shaft. The fifth sprocket is connected to the third sprocket 10 by using the transmission chain. The third sprocket is fixed to a road wheel shaft. Two ends of the road wheel shaft are rotatably connected to a bearing seat. The bearing seat is fixed to the rack. road wheels 11 are respectively connected to the two ends of the road wheel shaft. The road wheels are disposed in the middle of the rack. The engine can drive the road wheels to rotate by using the first chain transmission mechanism, thereby driving the entire garlic planter to move.

Figure 1:
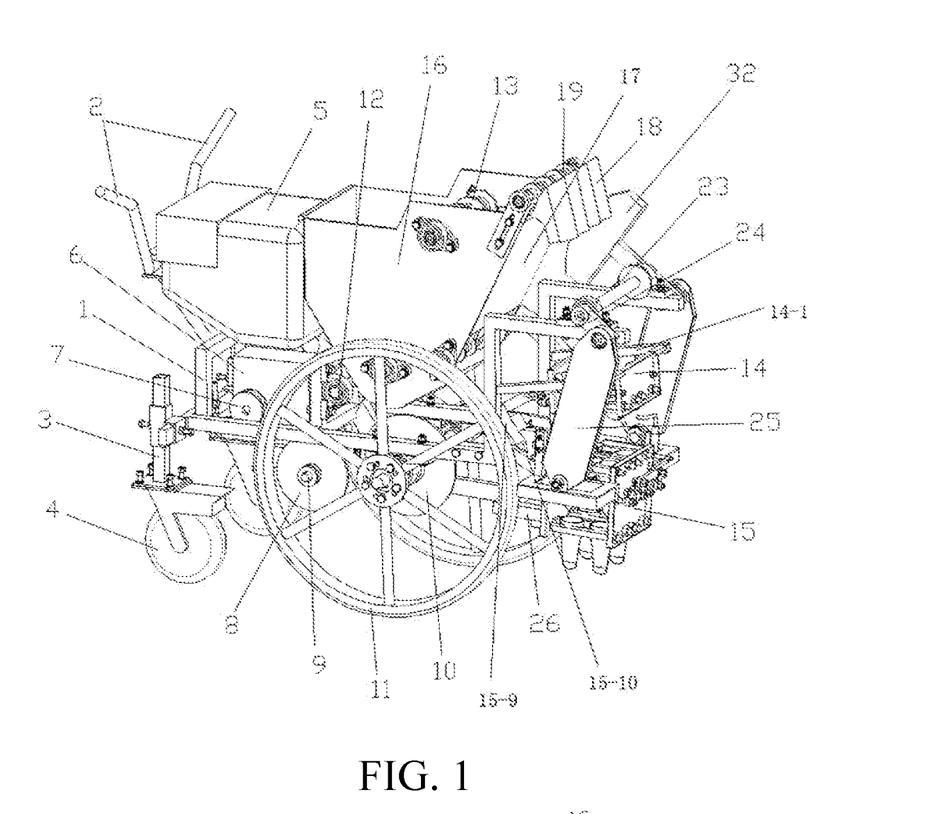
FIG. 1 is a schematic diagram of an overall mechanism according to Embodiment 1 of the present invention.
Figure 2:
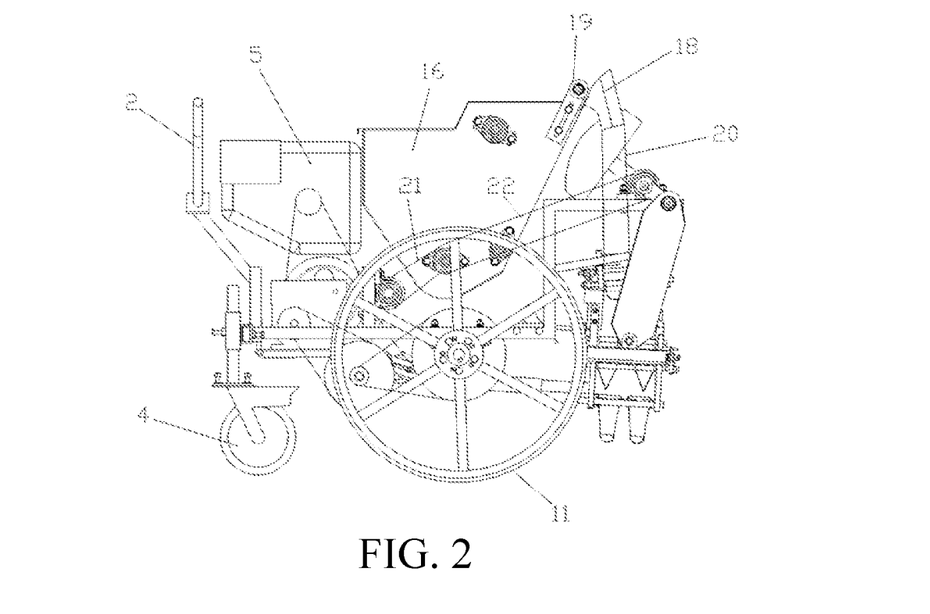
FIG. 2 is a schematic front view of an overall structure according to Embodiment 1 of the present invention.
Figure 3:
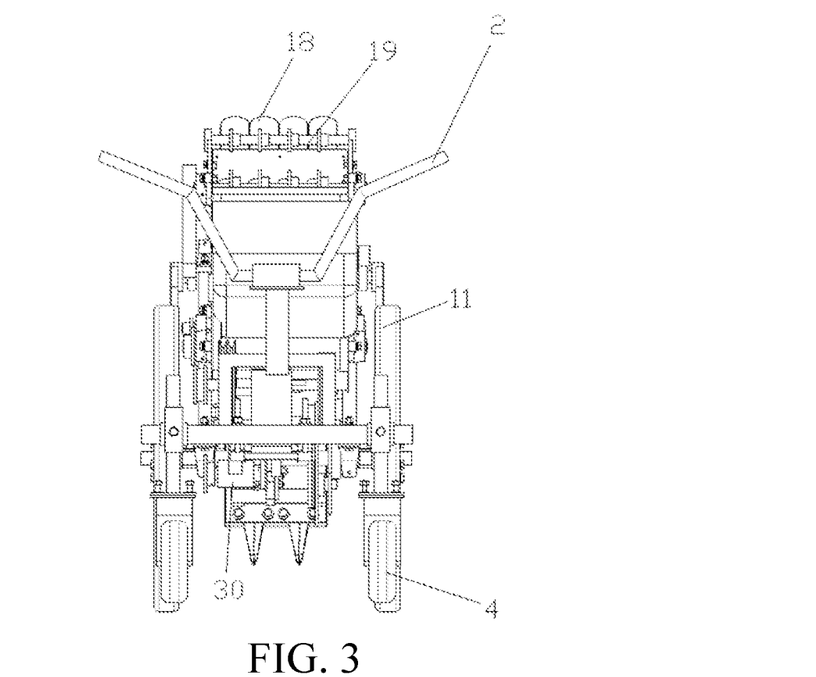
FIG. 3 is a schematic left view of the overall structure according to Embodiment 1 of the present invention.
Figure 4:
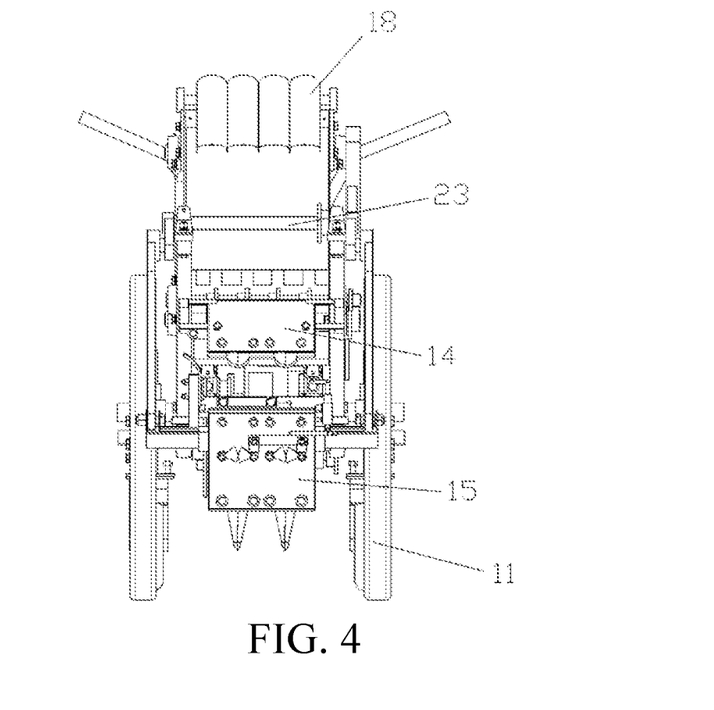
FIG. 4 is a schematic right view of the overall structure according to Embodiment 1 of the present invention.
Figure 5:
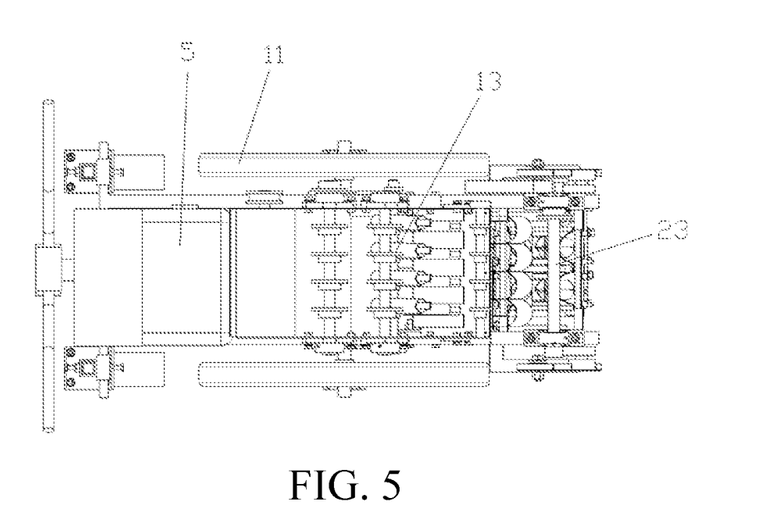
FIG. 5 is a schematic top view of the overall structure according to Embodiment 1 of the present invention.
Figure 6:
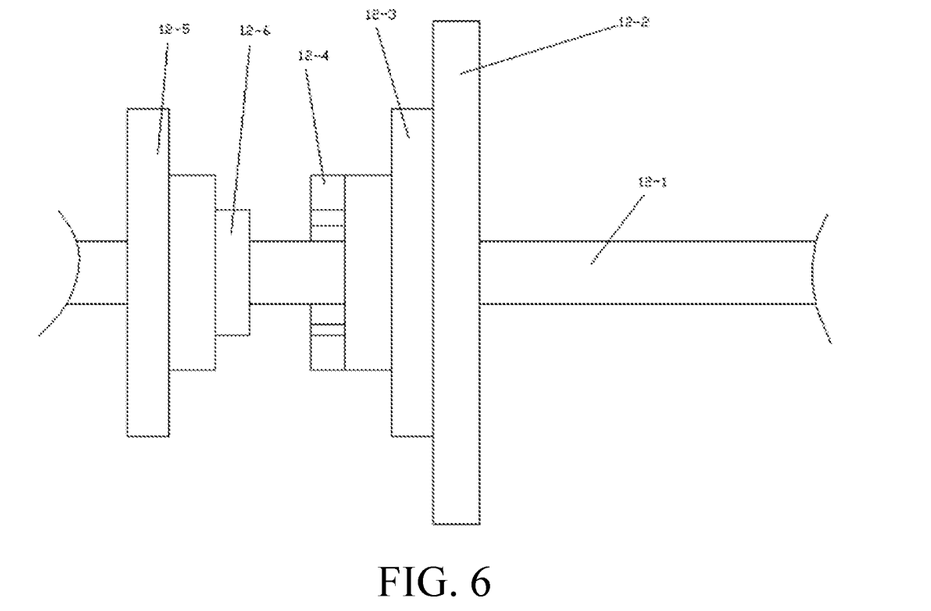
FIG. 6 is a schematic structural diagram of a clutch mechanism according to Embodiment 1 of the present invention.
Figure 7:
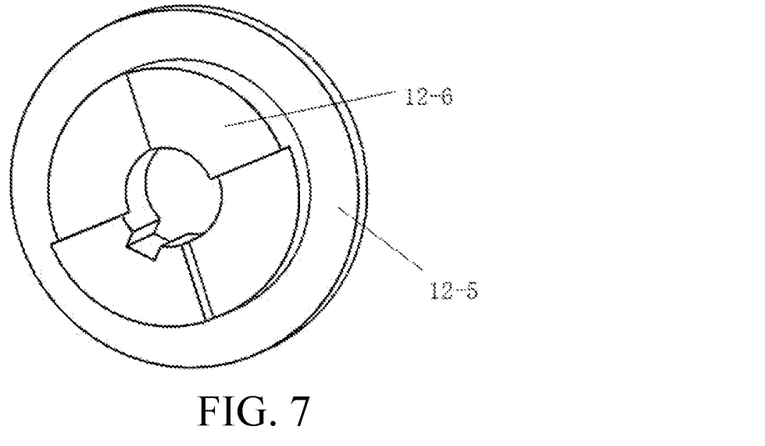
FIG. 7 is a schematic structural diagram of a second chuck according to Embodiment 1 of the present invention.

The output shaft of the decelerator is further connected to the clutch mechanism 12 by using a second chain transmission mechanism. The clutch mechanism includes a clutch shaft 12-1. Two ends of the clutch shaft are rotatably connected to the bearing seat. The bearing seat is fixed to the rack. A fourth sprocket 12-2 is rotatably connected to the clutch shaft. The fourth sprocket is freely rotatable relative to the clutch shaft. The fourth sprocket is connected to the output shaft of the decelerator by using the second chain transmission mechanism. A first chuck 12-3 is fixed to an end surface of the fourth sprocket. Two first fixtures 12-4 are disposed on the first chuck. The adjacent first fixtures form a first slot. A second chuck 12-5 mated with the first chuck is fixed to one end of the clutch shaft by using a key joint. Two second fixtures 12-6 mated with the first slot are disposed on the second chuck. A second groove mated with the first fixtures is provided between the adjacent second fixtures. The second chuck is connected to a shift fork. An operator may drive the shift fork to snap the first fixtures into the second slot and the second fixtures into the first slot, so as to transfer power of the fourth sprocket to the clutch shaft.

An other end of the clutch shaft is connected to the material taking mechanism 13 and the upright planting mechanism by using the third chain transmission mechanism 21 and the fourth chain transmission mechanism 22 respectively.

When the shift fork controls the first chuck to be separated from the second chuck, the fourth sprocket is idling on the clutch shaft, and the power outputted by the decelerator cannot be transferred to the material taking mechanism and the turnable mechanism. When the first chuck is engaged with the second chuck, the fourth sprocket can drive the clutch shaft to rotate, thereby transferring the power to the material taking mechanism and the turnable mechanism.

The material taking mechanism is disposed inside the stock bin 16. The stock bin is fixedly connected to the rack by using a stock bin support plate. The material taking mechanism adopts a two-stage material-taking and single-grain seed-taking device disclosed in the application No. 201910314922.2. The material taking mechanism includes a primary material taking mechanism and a secondary material taking mechanism arranged obliquely in the stock bin. The primary material taking mechanism includes a primary material taking scoop driven by a fifth chain transmission mechanism, and the secondary material taking mechanism includes a secondary material taking scoop driven by a sixth chain transmission mechanism. A material hopper is disposed between the fifth chain transmission mechanism and the sixth chain transmission mechanism. A round material receiving tube is fixed to a bottom end of the material hopper. The fifth chain transmission mechanism and the sixth chain transmission mechanism are connected to the clutch shaft by using the third chain transmission mechanism, so that the power of the decelerator is transferred to the material taking mechanism.

The upright planting mechanism includes a material receiving mechanism 14, an insertion type planting mechanism 15 disposed below the material receiving mechanism, and a turnable mechanism connected to the insertion type planting mechanism. The material receiving mechanism and the insertion type planting mechanism are disposed at a front end of the rack. The material receiving mechanism is fixedly connected to the rack. The insertion type planting mechanism is connected to the turnable mechanism mounted to the rack. The turnable mechanism is connected to the output shaft of the decelerator by using the fourth chain transmission mechanism, and can drive the insertion type planting mechanism to move according to a set arc trajectory.

A baffle 18 fixedly connected to a stock bin support plate 17 and a material guide roller 19 connected to the stock bin support plate are disposed at an outlet of the stock bin. A bottom end of the baffle is connected to the material receiving mechanism by using a feeding chute 20. The material guide roller can deliver, to the feeding chute, garlic seeds delivered by the material taking mechanism. The baffle can prevent the garlic seeds from leaking out. The material receiving mechanism can receive the garlic seeds delivered by the material taking mechanism.

Figure 9:
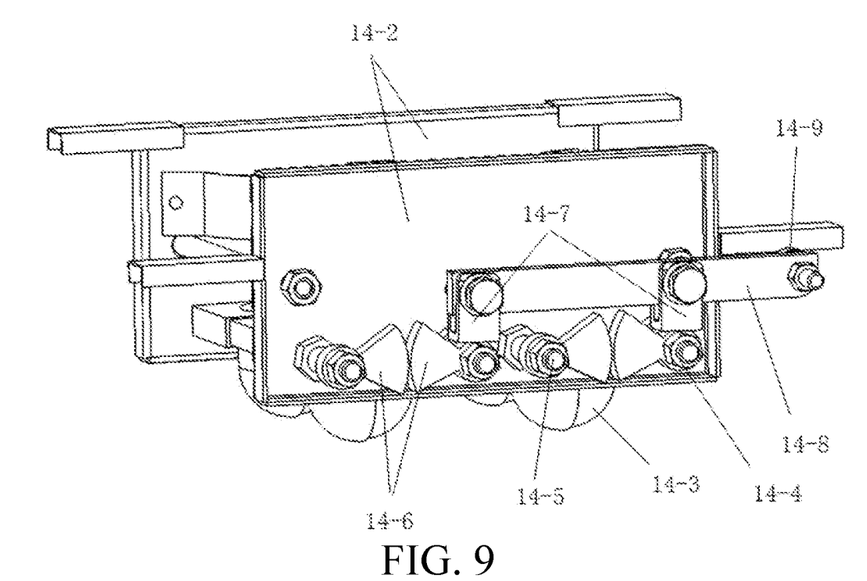
FIG. 9 is a schematic structural diagram of a material receiving mechanism according to Embodiment 1 of the present invention.

The material receiving mechanism 14 includes a first frame. The first frame includes two support rods 14-1 fixedly connected to the rack. Two parallel first mounting plates 14-2 are fixed between the two support rods. Two first material receiving rotary shaft sets are connected between the two first mounting plates. Two first feed bowls 14-3 are connected to each first material receiving rotary shaft set. The first feed bowls can receive the garlic seeds dropped from the feeding chute. A bottom of each first feed bowl is a hemispherical structure and includes two feed bowl portions. Each first material receiving rotary shaft set includes a first rotary shaft 14-4 and a second rotary shaft 14-5. Shaft sections of the first rotary shaft and the second rotary shaft that are between the two first mounting plates each are a square shaft. The first rotary shaft and the second rotary shaft are respectively fixedly connected to the two feed bowl portions of the each first feed bowl. The first rotary shaft and the second rotary shaft are rotatable to control the each first feed bowl to open and close. One ends of the first rotary shaft and the second rotary shaft that are close to the stock bin protrude out of the first mounting plates. The protruding shaft sections each are a round shaft and are connected to the first opening mechanism. The first opening mechanism can drive the first rotary shaft and the second rotary shaft to rotate.

The first opening mechanism includes two first fan-shaped gears 14-6 fixed to the round shaft ends of the first rotary shaft and the second rotary shaft and meshed with each other. The first rotary shaft is fixedly connected to one end of a connecting rod 14-7. An other end of the connecting rod is rotatably connected to an opening rod 14-8. An end of a connecting rod to which the first rotary shaft of an other material receiving rotary shaft set is also rotatably connected to the opening rod. The two connecting rods and the opening rod form a first parallelogram linkage. The first rotary shafts of the two material receiving rotary shaft sets are both connected to the first parallelogram linkage. A first bearing 14-9 is disposed at an end of the opening rod. When the opening rod moves, the first rotary shaft can be driven to rotate by using the connecting rod, and the second rotary shaft is driven to synchronously rotate by using the first fan-shaped gears, thereby driving the two feed bowl portions of the each first feed bowl to open and close. The opening rod is connected to a first elastic member. The first elastic member is a first spring. One end of the first spring is fixedly connected to the opening rod, and an other end is fixedly connected to the first mounting plate. The first spring is configured to cause the opening rod to return.

A first acting member is fixed to the insertion type planting mechanism. The first acting member is an inclined arcuate plate 14-10. The inclined arcuate plate is fixedly connected to the insertion type planting mechanism by using an inclined arcuate plate support 14-11. When the insertion type planting mechanism moves under the action of the turnable mechanism, the inclined arcuate plate can come into contact with the first bearing at the end of the opening rod, and the inclined arcuate plate can drive, by using the first bearing, the opening rod to overcome an elastic force of the first spring and move with the movement of the insertion type planting mechanism, so that the two feed bowl portions of the each first feed bowl are opened. After the inclined arcuate plate is separated from the first bearing, the first spring can drive the first opening rod to return, so that the first feed bowl is closed.

Figure 10:
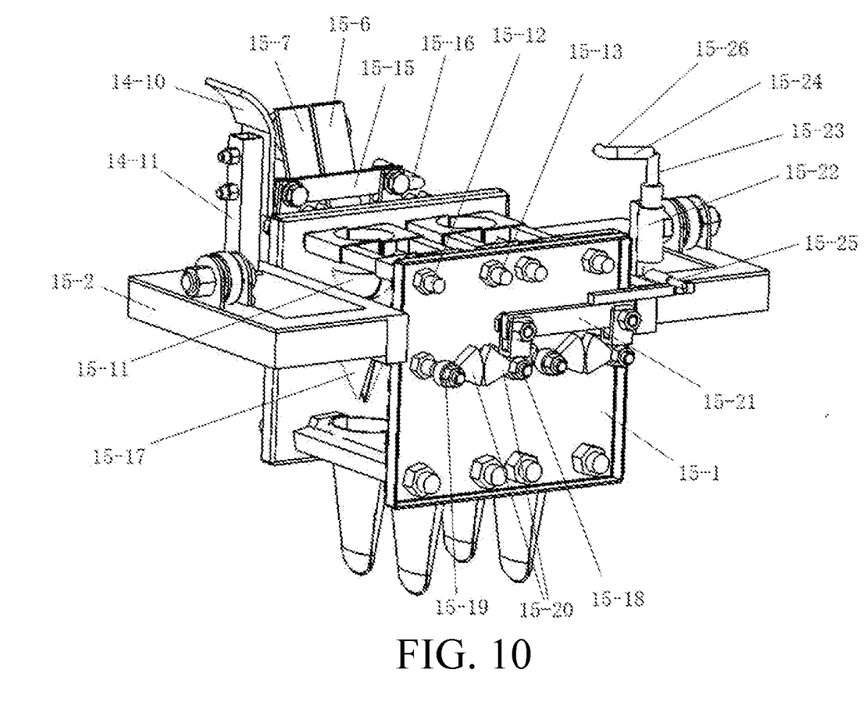
FIG. 10 is a schematic structural diagram I of an insertion type planting mechanism according to Embodiment 1 of the present invention.
Figure 11:
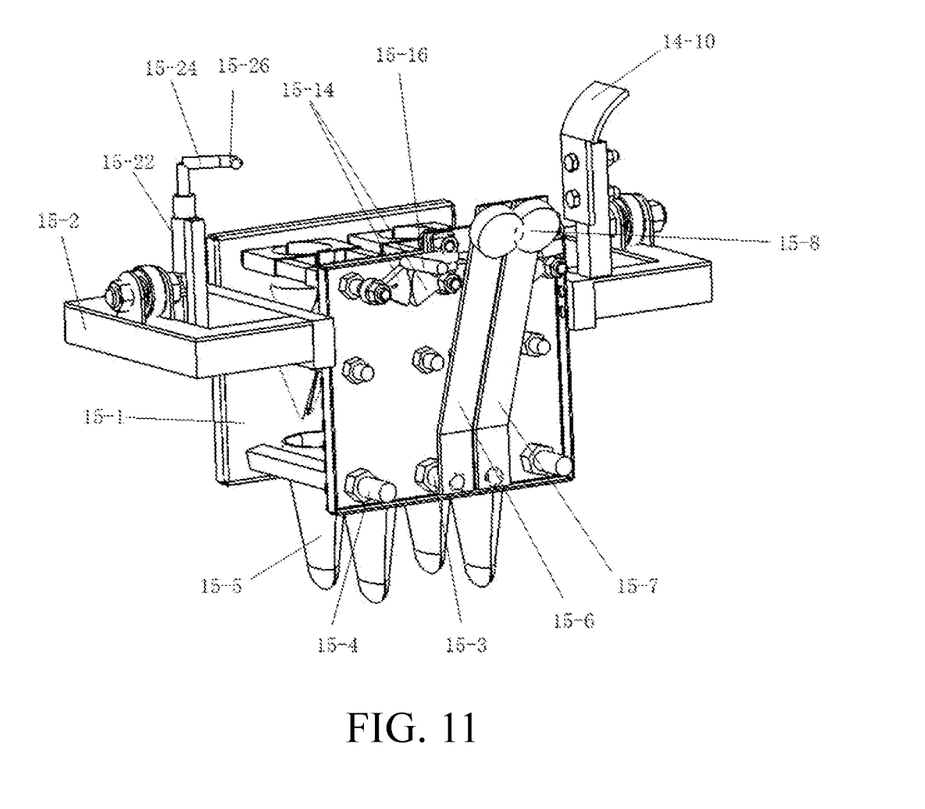
FIG. 11 is a schematic structural diagram II of the insertion type planting mechanism according to Embodiment 1 of the present invention.

The insertion type planting mechanism 15 includes a second frame. The inclined arcuate plate support is fixed to the second frame. The second frame includes two second mounting plates 15-1. Side frames 15-2 are disposed on two sides of the second mounting plates, and the side frames are configured to connect the second frame to the turnable mechanism.

Two insertion type planting rotary shaft sets are rotatably connected to bottoms of the two second mounting plates. Two duckbills are connected to each insertion type planting rotary shaft set. Each insertion type planting rotary shaft set includes a third rotary shaft 15-3 and a fourth rotary shaft 15-4. Shaft sections of the third rotary shaft and the fourth rotary shaft between the two second mounting plates each are a square shaft. The third rotary shaft and the fourth rotary shaft are respectively fixedly connected to a first duckbill portion and a second duckbill portion of a duckbill 15-5. Ends of the third rotary shaft and the fourth rotary shaft that are close to the stock bin protrude out of the second mounting plates. The protruding parts each are a round shaft section. The third rotary shaft in one of the insertion type planting rotary shaft sets that is located inside and the adjacent fourth rotary shaft in the other set are connected to the second opening mechanism. The second opening mechanism can control the third rotary shaft and the fourth rotary shaft that are located inside, thereby driving the two duckbill portions of the duckbill to open.

The second opening mechanism includes a first opening plate 15-6 and a second opening plate 15-7. A bottom end of the first opening plate is fixedly connected to the third rotary shaft in the first insertion type planting rotary shaft set. A bottom end of the second opening plate is fixedly connected to the fourth rotary shaft in the second insertion type planting rotary shaft set. A second bearing 15-8 is fixed to a top end of each of the first opening plate and the second opening plate. In this embodiment, the third rotary shaft in the first insertion type planting rotary shaft set is disposed adjacent to the fourth rotary shaft in the second insertion type planting rotary shaft set.

A second elastic member is fixed between the first opening plate and the second opening plate. The second elastic member is a second spring. Two ends of the second spring are respectively fixedly connected to the first opening plate and the second opening plate, and are configured to cause the first opening plate and the second opening plate to return.

A second acting member is fixed to the rack. The second acting member includes a support fixedly connected to the rack and a triangular plate 15-10 fixed to the support 15-9. The triangular plate has a tip structure. The tip structure can extend into a gap between the first opening plate and the second opening plate. The first opening plate and the second opening plate move with the insertion type planting mechanism. As the tip structure extends more deeply into the gap, top ends of the first opening plate and the second opening plate can be driven to open under the action of the second bearing, thereby driving the two duckbill portions to open. When the tip structure escapes from the first opening plate and the second opening plate, the first opening plate and the second opening plate return under the action of the second spring, so that the duckbill is closed.

Two first feed bowl rotary shaft sets are rotatably connected to tops of the two second mounting plates. Two second feed bowls 15-11 are connected to each first feed bowl rotary shaft set. A bottom of each second feed bowl is a hemispherical structure. Each first feed bowl rotary shaft set includes a fifth shaft 15-12 and a sixth shaft 15-13. Shaft sections of the fifth rotary shaft and the sixth rotary shaft that are between the two second mounting plates each are a square shaft, and are fixedly connected to two feed bowl portions of each second feed bowl. Ends of the fifth rotary shaft and the sixth rotary shaft that are close to the stock bin protrude out of the second mounting plates and each are a round shaft section. A third opening mechanism is connected to the round shaft sections. A structure of the third opening mechanism is the same as that of the first opening mechanism, and includes two second fan-shaped gears 15-14 connected to the round shaft sections of the fifth rotary shaft and the sixth rotary shaft respectively and meshed with each other. The two fifth rotary shafts of the two first feed bowl rotary shaft sets are connected to a second parallelogram linkage 15-15. A structure of the second parallelogram linkage is the same as that of the first parallelogram linkage, which is not described in detail herein. A third acting member is fixed to an opening rod of the second parallelogram linkage. The third acting member is a right-angled rod 15-16 fixed to the opening rod of the second parallelogram linkage. When the first opening plate and the second opening plate are separated, the first opening plate can come into contact with the right-angled rod. The opening rod of the second parallelogram linkage is driven by the right-angled rod to move, thereby driving the second feed bowls to open. A third elastic member is connected between the opening rod of the second parallelogram linkage and the second mounting plate. The third elastic member is a third spring. One end of the third spring is fixedly connected to the second mounting plate. An other end is fixedly connected to the opening rod of the second parallelogram linkage. When the first opening plate and the second opening plate are closed, the first opening rod is separated from the right-angled rod, and the second parallelogram linkage is caused to return under the action of the third spring, so that the second feed bowls are closed. In this embodiment, the second feed bowls and the duckbills can be opened and closed synchronously.

Two second feed bowl rotary shaft sets are disposed between the duckbills and the first feed bowls. Two third feed bowls 15-17 are mounted to each second feed bowl rotary shaft set. A bottom of each third feed bowl is an inverted cone structure. Each second feed bowl rotary shaft set includes a seventh rotary shaft 15-18 and an eighth rotary shaft 15-19. Two ends of the seventh rotary shaft and the eighth rotary shaft are rotatably connected to the two second mounting plates. The seventh rotary shaft and the eighth rotary shaft are fixedly connected to two feed bowl portions of each third feed bowl. Ends of the seventh rotary shaft and the eighth rotary shaft that are away from the stock bin protrude out of the second mounting plates, and each are a round shaft section and connected to a fourth opening mechanism. A structure of the fourth opening mechanism is the same as those of the first opening mechanism and the third opening mechanism, and includes three fan-shaped gears 15-20 fixedly connected to the seventh rotary shaft and the eighth rotary shaft and meshed with each other. The first rotary shafts of the two second feed bowl rotary shaft sets are connected to a third parallelogram linkage 15-21. A structure of the third parallelogram linkage is the same as that of the second/first parallelogram linkage, which is not described in detail herein.

A fourth acting member is fixed to a side frame on a side of the second mounting plate. The fourth acting member includes a rotary drum 15-22 fixed to the side frame. The rotary drum is fixedly connected to the side frame by using a rotary drum support. A bending rod is rotatably connected in the rotary drum. The bending rod includes a first support rod 15-23. A second support rod 15-24 and a third support rod 15-25 perpendicular to the first support rod are respectively disposed at two ends of the first support rod. Axes of the second support rod and the third support rod are perpendicular to each other. The third support rod can come into contact with an end of an opening rod of the third parallelogram linkage. An arcuate rod 15-26 is disposed at an end of the second support rod for contact with the first mounting plate of the material receiving mechanism.

When the insertion type planting mechanism moves, the second support rod can be driven to come into contact with the first mounting plate of the material receiving mechanism. Under the action of the first mounting plate, the bending rod rotates, and the third support rod can push the opening rod of the third parallelogram linkage to move, thereby driving the second feed bowls to open.

A fourth elastic member is disposed between the opening rod of the third parallelogram linkage and the second mounting plate. The fourth elastic member is a fourth spring. One end of the fourth spring is fixedly connected to the opening rod of the third parallelogram linkage, and an other end is fixedly connected to the second mounting plate. After the bending rod is separated from the first mounting plate, the fourth spring can drive the third opening rod of the parallelogram linkage to return, and the opening rod drives the bending rod to return.

Figure 8:
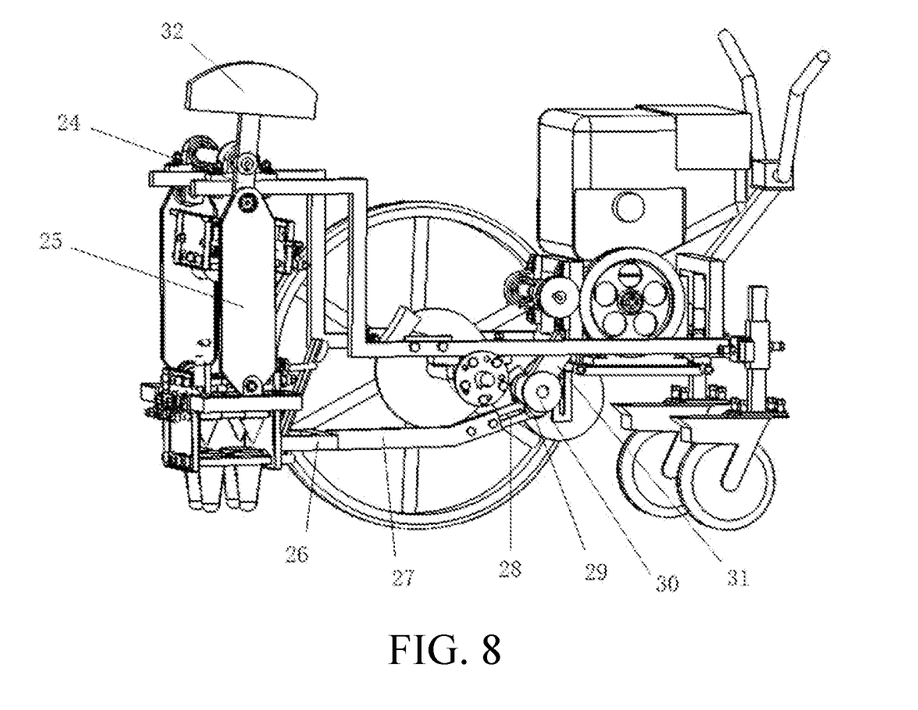
FIG. 8 is a schematic assembled diagram of a turnable mechanism and a rack according to Embodiment 1 of the present invention.

The insertion type planting mechanism is connected to the turnable mechanism, and the turnable mechanism is connected to the driving mechanism. The driving mechanism can drive the insertion type planting mechanism to reciprocate along the set arc trajectory by using the turnable mechanism.

The turnable mechanism includes a first turnable shaft 23 disposed at an upper part of a front section of the rack. The first turnable shaft is located above the material receiving mechanism. Two ends of the first turnable shaft are rotatably connected to the bearing seat. The bearing seat is fixed to the rack. The first turnable shaft is connected to the clutch shaft by using a fourth chain transmission mechanism 22. The clutch shaft can transfer the power of the decelerator to the first turnable shaft by using the fourth chain transmission mechanism. Two ends of the first turnable shaft are respectively fixedly connected to one ends of two first cranks 24. Other ends of the first cranks are rotatably connected to one end of a swingable arm 25. An other end of the swingable arm is rotatably connected to the insertion type planting mechanism by using a hinge seat disposed on the side frame. The second mounting plate of the insertion type planting mechanism that is close to the stock bin is further fixedly connected to one end of the connecting rod 27 by using a U-shaped rod 26. An other end of the connecting rod is fixedly connected to one end of an adjustment rod 28. A waist hole is provided on the adjustment rod. The connecting rod is connected to the adjustment rod through the waist hole and a bolt. Relative positions of the connecting rod and the adjustment rod may be adjusted through the waist hole, thereby adjusting the movement trajectory of the insertion type planting mechanism. An other end of the adjustment rod is rotatably connected to one end of a second crank 29. An other end of the second crank is connected to a second turnable shaft. The second turnable shaft is rotatably connected to a shaft sleeve 30 by using a bearing. The shaft sleeve is fixed to the rack by using a shaft sleeve support 31.

The power of the decelerator is transferred to the first turnable shaft through the clutch shaft and the fourth chain transmission mechanism. The first turnable shaft drives the first cranks to rotate, the first cranks drive the swingable arm to move, the swingable arm drives the insertion type planting mechanism to move, and the movement of the insertion type planting mechanism drives the connecting rod, the adjustment rod, and the second crank to move accordingly. Under the joint action of the swingable arm, the first cranks, the connecting rod, the adjustment rod, and the second crank, the driving mechanism can drive the insertion type planting mechanism to perform reciprocating movement along the set arc trajectory.

A counterweight 32 is connected to one end of the first turnable shaft to maintain balance.

To-be-planted garlic seeds are placed into the stock bin, the first chuck is separated from the second chuck by using the shift fork, and the engine is started. The engine only drives the road wheels to rotate. An operator moves the entire planter to a target position. After arrival, the operator engages the first chuck with the second chuck by using the shift fork. The power of the engine is transferred to the turnable mechanism and the material taking mechanism, so that the turnable mechanism and the material taking mechanism operate. The material taking mechanism drives the garlic seeds to fall into the first feed bowls through the feeding chute. The turnable mechanism drives the insertion type planting mechanism to perform reciprocating movement according to the set trajectory. The inclined arcuate plate comes into contact with the first bearing at the end of the opening rod of the first parallelogram linkage. The movement of the inclined arcuate plate drives the opening rod to move, so that the first rotary shaft and the second rotary shaft rotate, and the first feed bowls are opened. Therefore, the garlic seeds fall into the second feed bowls. The movement of the insertion type planting mechanism causes the tip structure of the triangular plate to extend into the gap between the first opening plate and the second opening plate. The tip structure can open the top ends of the first opening plate and the second opening plate under the joint action of the movement of the insertion type planting mechanism and the second bearing. The right-angled rod drives the second parallelogram linkage to operate, so that the second feed bowls are opened. Therefore, the garlic seeds in the second feed bowls fall into the third feed bowls. The insertion type planting mechanism moves to cause the bending rod to come into contact with the first mounting plate of the material receiving mechanism, and the bending rod rotates, so that the third parallelogram linkage drives the third feed bowls to open. Therefore, the garlic seeds fall into the duckbills. The duckbills are opened by using the first opening plate and the second opening plate to plant the garlic seeds into soil. The operator holds handrails, and the entire planter moves under the action of the road wheels to plant the garlic seeds into the soil.

In a reciprocating movement cycle of the insertion type planting mechanism, the garlic seeds fall from the first feed bowls into the second feed bowls, the third feed bowls, and the duckbills successively, and are planted into the soil through the duckbills. During the falling of the garlic seeds, buds of the garlic seeds are upright under the gravity. Since the bottoms of the third feed bowls are inverted cone structures, facilitating upright planting of the garlic seeds.

According to the garlic planting device of this embodiment, the feed bowls and the duckbills do not require an air pump. Instead, the feed bowls and the duckbills are opened by means of the mechanical collision during the reciprocating movement of the insertion type planting mechanism. The entire planting device is small, and therefore can achieve planting of garlic seeds in small plots. In addition, the planting device can achieve upright planting, achieving automatic planting of garlic seeds in small plots.

The specific implementations of the present invention are described above with reference to the accompanying drawings, but are not intended to limit the protection scope of the present invention. A person skilled in the art should understand that various modifications or deformations may be made without creative efforts based on the technical solutions of the present invention, and such modifications or deformations shall fall within the protection scope of the present invention.

What is claimed is:

1. A small hand-guided self-propelled garlic planter, comprising: a rack, wherein a driving mechanism is disposed on the rack, the driving mechanism is connected to road wheels, and is connected to an upright planting mechanism and a material taking mechanism in a stock bin by using a clutch mechanism, and the stock bin is fixedly connected to the rack; and the upright planting mechanism comprises a material receiving mechanism fixed to the rack and an insertion type planting mechanism disposed below the material receiving mechanism, the insertion type planting mechanism is connected to a turnable mechanism mounted to the rack, the turnable mechanism is connected to the driving mechanism, the driving mechanism is capable of driving, by using the turnable mechanism, the insertion type planting mechanism to move according to a set arc trajectory, a plurality of openable and closable first feed bowls are disposed on the material receiving mechanism, the first feed bowls are configured to receive garlic seeds delivered by the material taking mechanism, the first feed bowls are connected to a first opening mechanism, a first acting member is disposed on the insertion type planting mechanism, the movement of the insertion type planting mechanism causes the first acting member to drive the first opening mechanism to operate, and the first opening mechanism is capable of driving the first feed bowls to open, so that the garlic seeds fall into the insertion type planting mechanism, a plurality of openable and closable duckbills are disposed on the insertion type planting mechanism, the duckbills are configured to receive garlic seeds dropped from the first feed bowls, the duckbills are connected to a second opening mechanism, a second acting member is disposed on the rack, the insertion type planting mechanism is configured to move to cause the second acting member to drive the second opening mechanism to operate, and the second opening mechanism is capable of driving the duckbills to open to plant the garlic seeds.

2. The small hand-guided self-propelled garlic planter according to claim 1, wherein the turnable mechanism comprises a first turnable shaft connected to the driving mechanism, the first turnable shaft is fixedly connected to one end of a first crank, an other end of the first crank is rotatably connected to one end of a swingable arm, an other end of the swingable arm is rotatably connected to the insertion type planting mechanism, the insertion type planting mechanism is fixedly connected to one end of a connecting rod, an other end of the connecting rod is rotatably connected to one end of a second crank, and an other end of the second crank is rotatably connected to a second turnable shaft disposed on the rack.

3. The small hand-guided self-propelled garlic planter according to claim 2, wherein a counterweight is fixedly connected to an end of the first turnable shaft, and the counterweight is rotatable by the first turnable shaft.

4. The small hand-guided self-propelled garlic planter according to claim 1, wherein the material receiving mechanism comprises a first frame, a plurality of material receiving rotary shaft sets are rotatably connected to the first frame, each material receiving rotary shaft set comprises a first rotary shaft and a second rotary shaft, and the first rotary shaft and the second rotary shaft are respectively fixedly connected to two feed bowl portions of each first feed bowl; and further, the first opening mechanism comprises fan-shaped gears respectively disposed on ends of the first rotary shaft and the second rotary shaft and meshed with each other, the plurality of first rotary shafts are all connected to a first parallelogram linkage, the first acting member is configured to be in contact with the first rotary shaft, and is capable of driving, by using the parallelogram linkage, the first rotary shafts to rotate, the first parallelogram linkage is connected to a first elastic member disposed on the first frame, and the first elastic member is configured to cause the first parallelogram linkage to return.

5. The small hand-guided self-propelled garlic planter according to claim 1, wherein the insertion type planting mechanism comprises a second frame, a plurality of insertion type planting rotary shaft sets are rotatably connected to the second frame, each insertion type planting rotary shaft set comprises a third rotary shaft and a fourth rotary shaft, and the third rotary shaft and the fourth rotary shaft are respectively fixedly connected to a first duckbill portion and a second duckbill portion of each duckbill; and further, the second opening mechanism comprises two opening plates, one ends of the two opening plates are respectively fixedly connected to ends of third rotary shafts and fourth rotary shafts of adjacent insertion type planting rotary shaft sets, the second acting member has a tip structure, the tip structure is configured to be inserted into a gap between the two opening plates, the movement of the insertion type planting mechanism drives other ends of the two opening plates to open, and a second elastic member is disposed between the two opening plates to cause the two opening plates to return.

6. The small hand-guided self-propelled garlic planter according to claim 5, wherein a plurality of second feed bowls are disposed above the duckbills, the second feed bowls are connected to a third opening mechanism, and the opening plates are capable of driving the third opening mechanism to drive the second feed bowls to open;

further, a plurality of first feed bowl rotary shaft sets rotatably connected to the second frame are disposed above the duckbills, each first feed bowl rotary shaft set comprises a fifth rotary shaft and a sixth rotary shaft, the fifth rotary shaft and the sixth rotary shaft are respectively connected to two feed bowl portions of each second feed bowl; and further, the third opening mechanism comprises fan-shaped gears connected to ends of the fifth rotary shaft and the sixth rotary shaft and meshed with each other, the plurality of fifth rotary shaft shafts are connected to a second parallelogram linkage, a third acting member is disposed on the second parallelogram linkage, the opening of the opening plates drives the third acting member to drive the second parallelogram linkage to operate, to open the second feed bowls, the second parallelogram linkage is connected to a third elastic member disposed on the second frame, and the third elastic member is configured to cause the second parallelogram linkage to return.

7. The small hand-guided self-propelled garlic planter according to claim 6, wherein a plurality of third feed bowls each having an inverted cone structure are disposed between the second feed bowls and the duckbills, the third feed bowls are connected to a fourth opening mechanism, and the movement of the insertion type planting mechanism causes the material receiving mechanism to drive the fourth opening mechanism to open the third feed bowls;

further, a plurality of second feed bowl rotary shaft sets rotatably connected to the second frame are disposed between the second feed bowl and the duckbill, each second feed bowl rotary shaft set comprises a seventh rotary shaft and an eighth rotary shaft, and the seventh rotary shaft and the eighth rotary shaft are respectively fixedly connected to two feed bowl portions of each third feed bowl; and further, the fourth opening mechanism comprises fan-shaped gears connected to ends of the seventh rotary shaft and the eighth rotary shaft and meshed with each other, a third parallelogram linkage is connected to the plurality of seventh rotary shaft shafts, the third parallelogram linkage is connected to a fourth acting member, and the material receiving mechanism is capable of driving the fourth acting member to drive the fourth opening mechanism to open the second feed bowls.

8. The small hand-guided self-propelled garlic planter according to claim 1, wherein a baffle is disposed at a material outlet of the stock bin, a feeding chute is connected between the baffle and the material receiving mechanism, and the garlic seeds enter the material receiving mechanism through the feeding chute.

9. The small hand-guided self-propelled garlic planter according to claim 1, wherein the driving mechanism is connected to the road wheels by using a first chain transmission mechanism, and is capable of driving the road wheels to rotate.

10. The small hand-guided self-propelled garlic planter according to claim 1, wherein the clutch mechanism comprises a clutch shaft, two ends of the clutch shaft are rotatably connected to the rack by using a bearing seat, a sprocket is rotatably connected to the clutch shaft, a first chuck is fixed to the sprocket, a second chuck mated with the first chuck is fixed to the clutch shaft, the first chuck is configured to be engaged with the second chuck, a shift fork is connected to the second chuck, the shift fork is capable of driving the second chuck to be engaged with the first chuck, the sprocket is connected to the driving mechanism by using a second chain transmission mechanism, and the clutch shaft is connected to the material taking mechanism and the turnable mechanism by using the third chain transmission mechanism and a fourth chain transmission mechanism respectively.

\* \* \* \* \*